(12) United States Patent
Sprenger et al.

(10) Patent No.: US 10,705,899 B2
(45) Date of Patent: Jul. 7, 2020

(54) METHOD AND SYSTEM FOR DETECTING ERRORS IN LOCAL AREA NETWORK

(71) Applicant: CenturyLink Intellectual Property LLC, Broomfield, CO (US)

(72) Inventors: Michael D. Sprenger, Boulder, CO (US); Steven M. Casey, Littleton, CO (US); Katie S. Feiman, Englewood, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 8 days.

(21) Appl. No.: 16/201,881

(22) Filed: Nov. 27, 2018

(65) Prior Publication Data

US 2020/0169451 A1    May 28, 2020

(51) Int. Cl.
| | |
|---|---|
| *G06F 11/07* | (2006.01) |
| *H04L 12/24* | (2006.01) |
| *H04L 29/06* | (2006.01) |
| *H04L 12/26* | (2006.01) |
| *H04L 12/18* | (2006.01) |

(52) U.S. Cl.
CPC .......... *G06F 11/0742* (2013.01); *H04L 12/18* (2013.01); *H04L 41/0618* (2013.01); *H04L 41/0622* (2013.01); *H04L 41/0686* (2013.01); *H04L 41/22* (2013.01); *H04L 43/0888* (2013.01); *H04L 65/4092* (2013.01); *H04L 65/60* (2013.01); *H04L 65/80* (2013.01)

(58) Field of Classification Search
CPC ............. G06F 11/0748; G06F 11/0769; G06F 11/0742; G06F 11/3013; G06F 11/3055; G06F 11/3068; H04L 12/18; H04L 41/5009; H04L 41/5054; H04L 41/046; H04L 41/5038; H04L 43/12; H04L 65/60; H04L 65/608; H04L 65/80; H04L 67/02; H04L 67/42
See application file for complete search history.

(56) References Cited

U.S. PATENT DOCUMENTS

| | | | | |
|---|---|---|---|---|
| 2003/0009313 | A1* | 1/2003 | May .................... | G06F 11/0742 702/188 |
| 2007/0280232 | A1* | 12/2007 | Dec ......................... | H04L 12/18 370/390 |
| 2016/0164761 | A1* | 6/2016 | Sathyanarayana ...... | H04L 65/60 709/219 |

* cited by examiner

*Primary Examiner* — Kyung H Shin

(57) ABSTRACT

Novel tools and techniques are provided for implementing error detection in a network, and, more particularly, to methods, systems, and apparatuses for implementing error and/or fault detection in a network and/or media stream and providing options to address the error and/or fault in the network and/or media stream. In various embodiments, a computer might detect an error in a first network and send a notification indicating that the error has occurred. The notification might contain one or more options to address the error in the first network. The computer, a user device, a service provider device, or a content provider device might receive and display the notification containing the one or more options. The computer, the user device, the service provider device, or the content provider device might then select at least one of the one or more options to address the error in the first network.

18 Claims, 8 Drawing Sheets

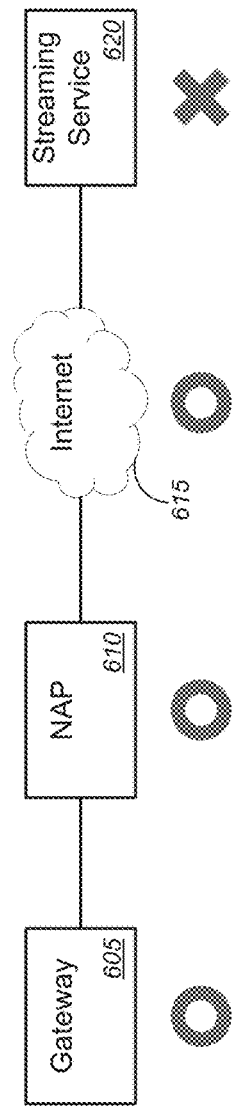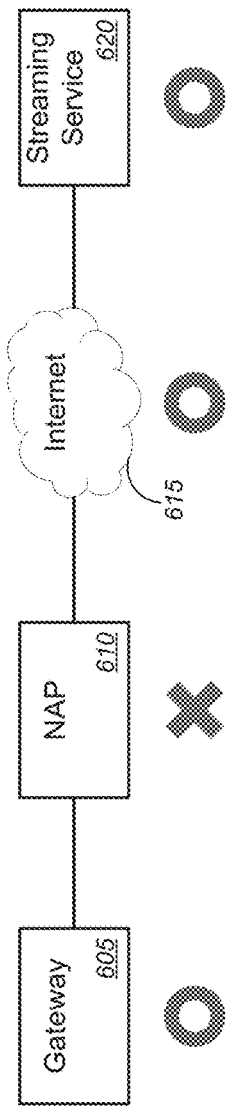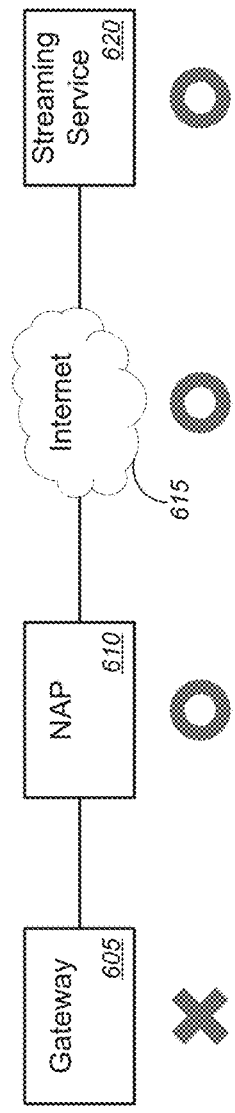

METHOD AND SYSTEM FOR DETECTING ERRORS IN LOCAL AREA NETWORK

CROSS-REFERENCES TO RELATED APPLICATIONS

This application may be related to U.S. patent application Ser. No. 15/966,387 (the "'387 Application"), filed on Apr. 30, 2018 by Michael D. Sprenger et al., entitled, "System and Method for Displaying and Interacting with Notifications," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing error detection in a network, and, more particularly, to methods, systems, and apparatuses for implementing error and/or fault detection in a network and/or media stream and providing options to address the error and/or fault in the network and/or media stream.

BACKGROUND

Currently, when an error or fault occurs in a customer's network, the customer often does not know what caused the error or how to correct the error. The customer must call the service provider and/or content provider to correct the error or fault in the network. Additionally, the service provider and/or content provider must rely on the customer's description of the error to address the error.

Hence, there is a need for more robust and scalable solutions for implementing error detection in a network, and, more particularly, to methods, systems, and apparatuses for implementing error and/or fault detection in a network and/or media stream and providing options to address the error and/or fault in the network and/or media stream.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 6A-6C are block diagrams illustrating various non-limiting examples of error and/or fault detection in a network(s), in accordance with various embodiments.

DETAILED DESCRIPTION OF CERTAIN EMBODIMENTS

Overview

Figure 1:
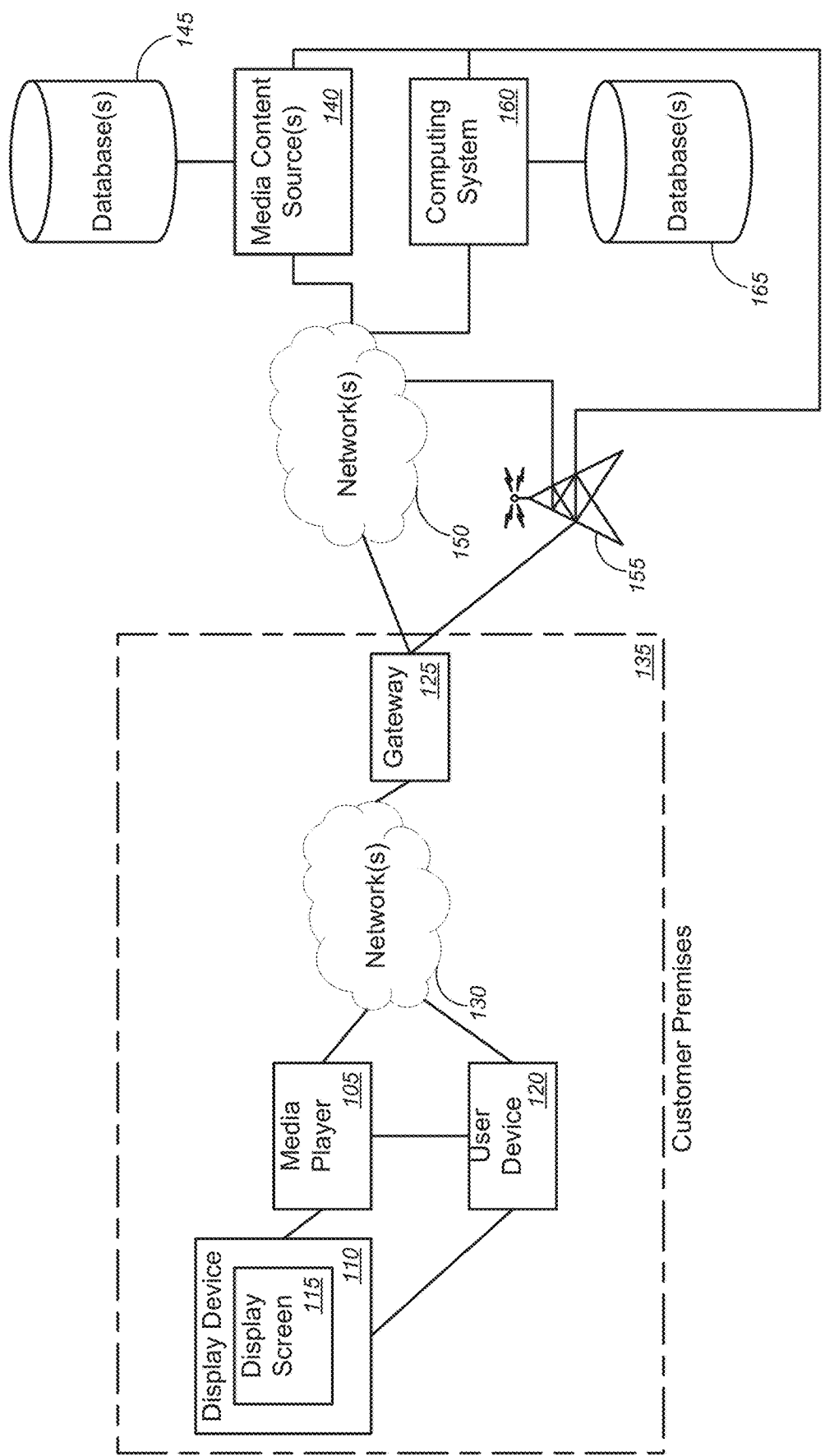
FIG. 1 is a schematic diagram illustrating a system for implementing error and/or fault detection in a network(s) and/or media stream, in accordance with various embodiments.

Various embodiments provide tools and techniques for implementing error detection in a network, and, more particularly, to methods, systems, and apparatuses for implementing error and/or fault detection in a network and/or media stream and providing options to address the error and/or fault in the network and/or media stream.

In various embodiments, a computer might detect an error in a first network and send a notification indicating that the error has occurred. The notification might contain one or more options to address the error in the first network. The computer, a user device, a service provider device, or a content provider device might receive and display the notification containing the one or more options. The computer, the user device, the service provider device, or the content provider device might then select at least one of the one or more options to address the error in the first network.

In other embodiments, a media player might stream a media content stream containing at least one media content. The media player might detect an error in a network influencing streaming of the media content stream. The media player might send a notification to at least one of a user device, a service provider device, or a content provider device. The notification might contain information associated with the error in the network and information associated with the media content stream. The notification might additionally include one or more options to address the error occurring with the media content stream.

In sum, the various embodiments provide a computer/media player that detects an error occurring in a network/media content stream. The computer/media player might provide a user, service provider, content provider, and/or the like with options to immediately address and resolve the error in the network/media content stream. Further advantages of such a system include, without limitation, information associated with an error to be sent immediately to a user, service provider, content provider, etc., options to immediately resolve/correct the error, different ways to view/record a media content stream, etc. The customer is also relieved from having to describe the error occurring in the network/media content stream because this information may be sent directly to the service provider, content provider, etc.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, error/fault detection in a network, error/fault repair in network, and/or the like. In other aspects, certain embodiments can improve the functioning of user equipment or systems themselves (e.g., media players, set-top boxes ("STBs"), media content streaming or downloading systems, gateway devices, user devices, etc.), for example, by sending, with a computer, a notification indicating that the error has occurred in the first network to at least one of a user device, a service provider device, or a content provider device, wherein the notification contains one or more options to address the error in the first network and selecting, with one or more user devices, the service provider device, or the content provider device, at least one of the one or more options to address the error in the first network, errors/faults in a network may be easily addressed and resolved; and/or the like. In particular, to the extent any abstract concepts are present in the various embodiments, those concepts can be implemented as described herein by devices, software, systems, and methods that involve specific novel functionality (e.g., steps or operations), such as, detecting, with a computer, an error in a first network; sending, with the computer, a notification indicating that the error has occurred in the first network to at least one of a plurality of user devices, a service provider device, or a content provider device, wherein the notification contains one or more options to address the error in the first network; receiving, with one or more user devices of the plurality of user devices, the service provider device, or the content provider device, the notification indicating that the error has occurred in the first network; displaying, with the one or more user devices, the service provider device, or the content provider device, the notification containing the one or more options to address the error in the first network; and selecting, with the one or more user devices, the service provider device, or the content provider device, at least one of the one or more options to address the error in the first network, and/or the like, which optimizes error and/or fault detection in a network and resolution of errors and/or faults in a network, and/or the like, to name a few examples, that extend beyond mere conventional computer processing operations. These functionalities can produce tangible results outside of the implementing computer system, including, merely by way of example, optimized error and/or fault detection, error and/or fault resolution, streaming of media content, and/or the like, at least some of which may be observed or measured by customers and/or service providers.

In an aspect, a method might comprise detecting, with a computing system, an error in a first network; sending, with the computer, a notification indicating that the error has occurred in the first network to at least one of a user device, a service provider device, or a content provider device, wherein the notification contains one or more options to address the error in the first network; receiving, with the at least one of the user device, the service provider device, or the content provider device, the notification indicating that the error has occurred in the first network; displaying, with the at least one of the user device, the service provider device, or the content provider device, the notification containing the one or more options to address the error in the first network; and selecting, with the at least one of the user device, the service provider device, or the content provider device, at least one of the one or more options to address the error in the first network.

In some embodiments, the computing system may be the same as one or more of the at least one of the user device, the service provider device, or the content provider device. In other embodiments, the computing system may be different from at least one of the user device, the service provider device, or the content provider device. The computing system may be at least one of a modem, a gateway, a set top box, a desktop computer, a laptop computer, a tablet computer, a server computer, a wireless phone, a video game console, or a remote-control device, and/or the like. Each of the at least one of the user device, the service provider device, or the content provider device may be at least one of a set top box, a desktop computer, a laptop computer, a tablet computer, a server computer, a wireless phone, a gaming console, or a remote-control device, and/or the like.

According to some embodiments, sending the notification might further comprise sending, with the computing system, the notification over a second network, wherein the second network is different from the first network.

Merely by way of example, in some cases, the notification might include an identification of the error occurring in the first network. The notification might indicate that the error is a reduction in bandwidth. Additionally and/or alternatively, the notification might indicate that the error in the first network is at least one of an error occurring in a Wi-Fi connection, an error occurring in a digital subscriber line, an error occurring in a fiber-optic connection, or an error occurring in at least one of a modem, a gateway, a set top box, a desktop computer, a laptop computer, a tablet computer, a wireless phone, a gaming console, a media player, or a remote-control device, and/or the like.

In some embodiments, the one or more options to address the error in the first network might include at least one of: (1) an option to display instructions indicating steps to follow to address the error in the first network; (2) an option to contact at least one of a user, a service provider, or a content provider; (3) an option to automatically set up a call or a chat session between the user and at least one of the service provider or the content provider; (4) an option to restart at least one of a modem, a gateway, a set top box, a desktop computer, a laptop computer, a tablet computer, a wireless phone, a gaming console, a media player, or a remote control device; (5) an option to open a ticket indicating the error in the first network with at least one of the service provider or the content provider; and/or (6) an option to run a bot with predetermined steps to determine whether the error is local or system-wide using remote test automation ("RTA") or the like, and either to return results to the system and/or the user with information regarding the error and/or to automatically solve the error based on the RTA with option to contact the user with a notification indicating that the error has been solved; and/or the like. The option to automatically set up the call or the chat session further comprises an option to start a video call or an instant messaging session with at least one of the user, the service provider, or the content provider.

In some cases, selecting the at least one of the one or more options to address the error in the first network might cause one or more of: (1) at least one of the instructions indicating steps to follow to address the error in the first network to be displayed; (2) at least one of the user, the service provider, or the content provider to be contacted; (3) the call or the chat session between the user and at least one of the service provider or the content provider to be set up; (4) at least one of the modem, the gateway, the set top box, the desktop computer, the laptop computer, the tablet computer, the wireless phone, the gaming console, the media player, or the remote control device to be restarted; (5) the ticket indicating the error with the first network with at least one of the service provider or the content provider to be opened; and/or (6) the system to perform RTA to determine whether the error is local or system-wide and either to return the results to the system and/or the user with information regarding the error and/or to automatically solve the error based on the RTA and to optionally contact the user with the notification indicating that the error has been solved; and/or the like.

In various cases, the method might additionally comprise streaming, with the user device, a media content stream; determining, with the user device, whether the error is influencing streaming of the media content stream; and based on a determination that the error is influencing streaming of the media content stream, performing at least one of automatically recording the media content stream or switching a source of media content stream.

In another aspect, a system might comprise a first computing system and at least one of a user device, a service provider device, or a content provider device. The first computing system might comprise at least one first processor; and a first non-transitory computer readable medium communicatively coupled to the at least one first processor. The first non-transitory computer readable medium might have stored thereon computer software comprising a first set of instructions that, when executed by the at least one first processor, causes the first computing system to: detect an error in a first network; and send a notification indicating that the error has occurred in the first network to at least one of a user device, a service provider device, or a content provider device, wherein the notification contains one or more options to address the error in the first network.

The at least one of the user device, the service provider device, or the content provider device might each comprise at least one second processor; and a second non-transitory computer readable medium communicatively coupled to the at least one second processor. The second non-transitory computer readable medium might have stored thereon computer software comprising a second set of instructions that, when executed by the at least one second processor, causes the user device, the service provider device, or the content provider device to: receive the notification indicating that the error has occurred in the first network; display the notification containing the one or more options to address the error in the first network; and select at least one of the one or more options to address the error in the first network.

In some cases, the first computing system might be the same as one or more of the at least one of the user device, the service provider device, or the content provider device. In other cases, the first computing system might be different from at least one of the user device, the service provider device, or the content provider device.

According to some embodiments, the notification might include an identification of the error occurring in the first network. The error might be a reduction in bandwidth. Additionally and/or alternatively, the error in the first network might be at least one of an error occurring in a Wi-Fi connection, an error occurring in a digital subscriber line, an error occurring in a fiber-optic connection, or an error occurring in at least one of a modem, a gateway, a set top box, a desktop computer, a laptop computer, a tablet computer, a wireless phone, a gaming console, a media player, or a remote-control device, and/or the like.

In some embodiments, the one or more options to address the error in the first network might include at least one of: (1) an option to display instructions (e.g., via text message, e-mail, and/or the like, in cases that the service is down) indicating steps to follow to address the error in the first network; (2) an option to contact at least one of a user, a service provider, or a content provider; (3) an option to automatically set up a call or a chat session between the user and at least one of the service provider or the content provider; (4) an option to restart at least one of a modem, a gateway, a set top box, a desktop computer, a laptop computer, a tablet computer, a wireless phone, a gaming console, a media player, or a remote control device; and/or (5) an option to open a ticket indicating the error in the first network with at least one of the service provider or the content provider; and/or the like. The option to automatically set up the call or the chat session further comprises an option to start a video call or an instant messaging session with at least one of the user, the service provider, or the content provider.

In some cases, selecting the at least one of the one or more options to address the error in the first network might cause one or more of: (1) at least one of the instructions indicating steps to follow to address the error in the first network to be displayed; (2) at least one of the user, the service provider, or the content provider to be contacted; (3) the call or the chat session between the user and at least one of the service provider or the content provider to be set up; (4) at least one of the modem, the gateway, the set top box, the desktop computer, the laptop computer, the tablet computer, the wireless phone, the gaming console, the media player, or the remote control device to be restarted; and/or (5) the ticket indicating the error with the first network with at least one of the service provider or the content provider to be opened; and/or the like.

In yet another aspect, a method might comprise streaming, with a media player, a media content stream containing at least one media content; detecting, with the media player, an error in a network influencing streaming of the media content stream; and sending, with the media player, a notification to at least one of a user device, a service provider device, or a content provider device, wherein the notification comprises information associated with the error in the network and information associated with the media content stream.

In some embodiments, the media player may be at least one of a set top box, a desktop computer, a laptop computer, a tablet computer, a wireless phone, or a gaming console, and/or the like.

According to some embodiments, the information associated with the error in the network might include an identification of the error occurring in the network. The notification might indicate that the error is a reduction in bandwidth. Additionally and/or alternatively, the notification might indicate that the error in the network is at least one of an error occurring in a WiFi connection, an error occurring in a digital subscriber line, an error occurring in a fiber-optic connection, or an error occurring in at least one of a modem, a gateway, a set top box, a desktop computer, a laptop computer, a tablet computer, a wireless phone, a gaming console, a media player, or a remote-control device, and/or the like.

In some embodiments, the information associated with the media content stream might comprise at least one of a title of the at least one media content, a timestamp associated with the at least one media content, a channel associated with the at least one media content, or a network associated with the at least one media content, and/or the like. The timestamp might indicate at least one of a point in time in the media content stream when the error was detected or a point in time in the at least one media content that was saved before the error was detected. According to some embodiments, sending the notification to the at least one of the user device, the service provider device, or the content provider device might comprise periodically sending, with the media player, information associated with the media content stream to the at least one of the user device, the service provider device, or the content provider device.

The method might additionally include determining, with the media player, whether the error is influencing streaming of the media content stream; and based on a determination that the error is influencing streaming of the media content stream, performing, with the media player, at least one of automatically recording the media content stream or automatically switching a source of the media content stream.

In other embodiments, the method might comprise determining, with the media player, whether the error is influencing streaming of the media content stream; based on a determination that the error is influencing streaming of the media content stream, identifying, with the media player, one or more user devices available to stream the media content stream; and displaying, with the media player, a list of the identified one or more user devices available to stream the media content stream on a display screen of the media player.

Merely by way of example, the method might include based on the determination that the error is influencing streaming of the media content stream, streaming, with the identified one or more user devices, the media content stream, wherein the identified one or more user devices utilize the information associated with the at least one media content to identify the at least one media content that was streaming at the media player at a point in time when the error began influencing streaming of the media content stream. Additionally and/or alternatively, streaming, with the identified one or more user devices, the media content stream might comprise, based on the information associated with the at least one media content, determining, with the identified one or more user devices, at least one of a point in time in the media content when the error occurred or a point in time in the media content before the error occurred; and streaming, with the identified one or more user devices, the media content stream from at least one of the determined point in time in the media content when the error occurred or the determined point in time in the media content before the error occurred.

In an additional aspect, a system might comprise a media player and at least one identified device. The media player might comprise at least one first processor; and a first non-transitory computer readable medium communicatively coupled to the at least one first processor. The first non-transitory computer readable medium might have stored thereon computer software comprising a first set of instructions that, when executed by the at least one first processor, causes the media player to: stream a media content stream containing at least one media content; detect an error in a network influencing streaming of the media content stream; and send a notification to at least one of a user device, a service provider device, or a content provider device, wherein the notification comprises information associated with the error in the network and information associated with the media content stream.

According to some embodiments, the information associated with the error in the network might include an identification of the error occurring in the network. The notification might indicate that the error is a reduction in bandwidth. Additionally and/or alternatively, the notification might indicate that the error is at least one of an error occurring in a WiFi connection, an error occurring in a digital subscriber line, an error occurring in a fiber-optic connection, or an error occurring in at least one of a modem, a gateway, a set top box, a desktop computer, a laptop computer, a tablet computer, a wireless phone, a gaming console, a media player, or a remote-control device, and/or the like.

In some embodiments, the information associated with the media content stream might comprise at least one of a title of the at least one media content, a timestamp associated with the at least one media content, a channel associated with the at least one media content, or a network associated with the at least one media content, and/or the like. The timestamp might indicate at least one of a point in time in the media content stream when the error was detected or a point in time in the at least one media content that was saved before the error was detected.

The first set of instructions, when executed by the at least one first processor, might further cause the media player to determine whether the error is influencing streaming of the media content stream; and based on a determination that the error is influencing streaming of the media content stream, perform at least one of automatically recording the media content stream or automatically switching a source of the media content stream.

In some cases, the first set of instructions, when executed by the at least one first processor, might further cause the media player to determine whether the error is influencing streaming of the media content stream; based on a determination that the error is influencing streaming of the media content stream, identify one or more user devices available to stream the media content stream; display a list of the identified one or more devices available to stream the media content stream on a display screen of at least one of the media player, the user device, the service provider device, or the content provider device; and receive a selection of at least one identified device.

The at least one identified device might comprise at least one second processor; and a second non-transitory computer readable medium communicatively coupled to the at least one second processor. The second non-transitory computer readable medium might have stored thereon computer software comprising a second set of instructions that, when executed by the at least one second processor, causes the at least one identified device to: stream the media content stream based on the selection of the at least one identified device.

In some cases, the at least one identified device might utilize the information associated with the at least one media content to identify the at least one media content that was streaming at the media player at a point in time when the error began influencing streaming of the media content stream.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing error and/or fault detection in a network, and, more particularly, to methods, systems, and apparatuses for implementing error and/or fault detection in a network and/or media stream and providing options to address the error and/or fault in the network and/or media stream, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing error and/or fault detection in a network(s) and/or media stream, in accordance with various embodiments.

In the non-limiting embodiment of FIG. 1, system 100 might comprise a media player 105. System 100, according to some embodiments, might further comprise one or more display devices 110, which might each include a display screen(s) 115. Additionally and/or alternatively, system 100 might further comprise one or more user devices 120, and/or the like.

In some embodiments, the media player 105 might comprise one of a processor on the display device 110 running a software application ("app"), a processor on the user device 120 running an app, a media device, and/or the like. In some cases, the media device might include, but is not limited to, one of a set-top box ("STB"), a media player, a gaming console, a tablet computer, a wireless phone, a server computer, a desktop computer, or a laptop computer, and/or the like. The media device might also include, without limitation, one of a digital versatile disc or digital video disc ("DVD") player, a Blu-ray disc ("BD") player, a digital video recording ("DVR") device, a streaming video player, a streaming music player, or a streaming game player, and/or the like.

In some cases, the one or more display devices 110 might include, but are not limited to, at least one of one or more monitors (e.g., computer monitor or laptop monitor, or the like), one or more television sets (e.g., smart television sets or other television sets, or the like), or one or more screens (e.g., a phone screen, a tablet screen, and/or the like), and/or the like.

In some embodiments, the user device 120 might include, without limitation, one of a laptop computer, a tablet computer, a smart phone, a mobile phone, a personal digital assistant, a remote-control device, or a portable gaming device, and/or the like. Additionally and/or alternatively, the user device 120 might include, without limitation, at least one of a dedicated remote control device (with touchscreen display and/or other user interface device) that is associated with the media player 105 and/or display device 110, a universal remote control device (with touchscreen display and/or other user interface device) that has been paired, synced, or synchronized with the media player 105 and/or display device 110, a tablet computer that has been paired, synced, or synchronized with the media player 105 and/or display device 110, a smart phone that has been paired, synced, or synchronized with the media player 105 and/or display device 110, or other portable device (with touchscreen display and/or other user interface device) that has been paired, synced, or synchronized with the media player 105 and/or display device 110, and/or the like.

The media player 105 might communicatively couple to each of the one or more display devices 110 and/or the one or more user devices 120 via a wireless connection, via a wired connection, or via network 130 (which may be a local area network) and/or the like. Each of the one or more display devices 110 might be communicatively coupled to each of the display screen 115 and/or the one or more user devices 120 via a wireless connection, via a wired connection, or via network 130 (which may be a local area network), and/or the like.

Additionally and/or alternatively, the one or more media players 105 and/or the one or more user devices 120 might be communicatively coupled to one or more gateway(s) 125 via network(s) 130. In some cases, the media player 105, the one or more display devices 110 (including the display screen(s) 115), and the user device(s) 120 may be in communication with a network 130, which might be a local area network.

Additionally and/or alternatively, the media player 105, the one or more display devices 110 (including the display screen(s) 115), and the user device(s) 120 may be disposed within a customer premises 135, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

System 100 might further comprise one or more media (e.g., video, audio, or game) content sources or servers 140 and corresponding database(s) 145 that might communicatively couple to the media player 105 via one or more networks 150 (and, in some cases, via one or more telecommunications relay systems 155, which might include, without limitation, one or more wireless network interfaces (e.g., wireless modems, wireless access points, and the like), one or more towers (e.g., cellular towers, and/or the like), one or more satellites, and/or the like). Network(s) 150 and/or relay systems 155 might be communicatively coupled to media player 105, display device 110, user device 120, and/or network(s) 130, and/or the like via gateway 125 (which might include a residential gateway, a business gateway, or a commercial gateway, and/or the like), via a wired connection, via a wireless connection, and/or the like.

According to some embodiments, system 100 might additionally comprise remote computing system 160 and corresponding database(s) 165 that communicatively couple with the media player 105, the one or more display devices 110, the one or more user devices 120, and/or the like via the one or more networks 130, the one or more networks 150, or the one or more telecommunications relay systems 155, and/or the like. According to some embodiments, remote computing system 160 might comprise at least one of a server computer over a network, a cloud-based computing system over a network, a service provider device, and/or a content provider device, and/or the like.

In operation, in a first set of embodiments, the media player 105, the one or more display devices 110, the one or more user devices 120, the one or more gateways 125, one or more modems, one or more media content sources 140, one or more computing system 160, and/or the like might detect an error and/or fault within network(s) 130 and/or network(s) 150. The error and/or fault in the network(s) 130 and/or network(s) 150 may occur in a local area network, in a service provider network, in a content provider network, in the media player 105, in the display device 110, in the user device 120, in the media content source 140, in the gateway 125, and/or in the computing system 160, and/or the like.

In some embodiments, based on the detection of an error occurring in network(s) 130 and/or network(s) 150, the media player 105, display device 110, user device 120, media content sources 140, gateway 125, and/or computing system 160, and/or the like, may send a notification indicating that the error has occurred in the network(s) 130 and/or network(s) 150 to at least one of a display device 110, a user device 120, media content source 140, computing system 160 (which may include one or more service provider devices, one or more content provider devices, and/or the like), and/or the like. The notification may be sent via network(s) 130 and/or network(s) 150. Alternatively, if network(s) 130 and/or network(s) 150 are experiencing the error and/or fault and not transmitting communications and/or notifications, the notification may be sent via one or more different communications paths (e.g., via one or more telecommunications relay systems 155).

The notification may identify the error and/or fault occurring in the network. The identification of the error and/or fault may include an indication of a reduction in bandwidth, an indication that an error is occurring in at least one of the media player 105, display device 110, user device 120, network(s) 130, network(s) 150, gateway 125, media content source(s) 140, and/or computing system 160, an indication that an error is occurring in a digital subscriber line, an indication that an error is occurring in a fiber-optic connection, or an indication that an error is occurring in at least one of a modem, a gateway, a set top box, a desktop computer, a laptop computer, a tablet computer, a wireless phone, a gaming console, a media player, or a remote control device, and/or the like. Additionally and/or alternatively, the notification may indicate where an error is occurring (e.g., in a local area network 130, in a content provider and/or service provider network 150, and/or the like).

In some cases, the one or more display devices 110, the one or more user devices 120, the one or more service provider devices located in computing system 160, and/or the one or more content provider devices located in computing system 160, and/or the like might display the notification containing the one or more options to address the error in the network.

The notification may contain one or more options for a user, technician, service provider, content provider, and/or the like to address and/or correct the error in the network(s) 130 and/or network(s) 150. The one or more options may include, but are not limited to: (1) an option to display instructions indicating steps to follow to address the error in the network; (2) an option to contact at least one of a user, a service provider, or a content provider; (3) an option to automatically set up a call (e.g., a voice call, a video call, and/or the like) or a chat session (e.g., an instant messaging session or a text messaging session, etc.) between the user and at least one of the service provider or the content provider; (4) an option to restart at least one of a modem, a gateway, a set top box, a desktop computer, a laptop computer, a tablet computer, a wireless phone, a gaming console, a media player, or a remote control device; and/or (5) an option to open a ticket indicating the error in the network with at least one of the service provider or the content provider; and/or the like.

In various embodiments, a user, technician, service provider, and/or content provider may select via the display device 110, user device 120, the service provider device, and/or the content provider device, at least one option to address the error occurring in network(s) 130 and/or network(s) 150. By selecting at least one of the one or more options, at least one of the following may occur: (1) at least one of a user device 120, a display device 110, a service provider device, and/or a content provider device may display instructions indicating steps to follow to address the error in the network; (2) an email, text message, or the like may be sent to at least one of a user (via at least one of a user device 120, a display device 110, and/or the like), a service provider (via at least one of a content provider device), a content provider (via at least one of a content provider device) to contact at least one of the user, service provider, and/or content provider; (3) a call (e.g., a voice call, a video call, and/or the like) or a chat session (e.g., an instant messaging session or a text messaging session, etc.) may be automatically set up between the user (via a user device 120 and/or display device 110) and at least one of the service provider (via a service provider device) or the content provide (via a content provider device); (4) at least one of a media player 105, display device 110, user device 120, gateway 125, modem, a set top box, a desktop computer, a laptop computer, a tablet computer, a wireless phone, a gaming console, a media player, or a remote control device may be automatically restarted; and/or (5) a ticket indicating the error in the network may be opened with at least one of the service provider or the content provider.

Additionally and/or alternatively, the notification may indicate where the error is occurring, whether the error and/or fault may be corrected by a user at the customer premises 135, or whether a technician needs to be sent to the customer premises 135 to fix the error. If an error and/or fault cannot be corrected by a user, then the one or more options might additionally include an option to schedule a technician to repair the fault at the customer premises 135. Selecting this option may schedule a technician to come to the customer premises 135 to repair the fault. The notification may then be sent to a device of the technician scheduled to repair the fault and include steps to address the fault in the network 130. Alternatively, a remote test bot and system information may be used (either per error basis or on a monthly sweep basis, or the like) to speed up technician repair time and to assign the repair task to the correct or appropriate technician team.

Additionally and/or alternatively, at least one of the media player 105, display device 110, user device 120, media content source 140 (which may include a service provider device, a content provider device, and/or the like), or computing system 160 (which may include a service provider device, a content provider device, and/or the like) may determine that an error and/or fault is occurring with a media content stream. Based on a determination that the error is influencing streaming of the media content stream, at least one of the media player 105, display device 110, user device 120, media content source 140 (which may include a service provider device, a content provider device, and/or the like), gateway 125, computing system 160 (which may include a service provider device, a content provider device, and/or the like) may automatically record the media content stream or switch a source (e.g., switch a content provider, switch to on-demand, switch to broadcast, switch to satellite, switch Internet source, and/or the like) of the media content stream.

In operation, in a second embodiment, media player 105 may detect an error occurring in the streaming of a media content stream. The media player 105 may then send a notification to at least one of a display device 110, a user device 120, and/or computing system 160 (which may include at least one of a service provider device and/or content provider device, and/or the like), and/or the like. The notification may include information associated with the error in the network and information associated with the media content stream.

The information associated with the error in the network may include an identification of the error occurring in the network. The identification of the error and/or fault may include an indication of a reduction in bandwidth, an indication that an error is occurring in at least one of the media player 105, display device 110, user device 120, gateway 125, media content sources 140, network(s) 130, network(s) 150, and/or computing system 160, an indication that an error is occurring in a digital subscriber line, an indication that an error is occurring in a fiber-optic connection, or an indication that an error is occurring in at least one of a modem, a gateway, a set top box, a desktop computer, a laptop computer, a tablet computer, a wireless phone, a gaming console, a media player, or a remote control device, and/or the like.

The information associated with the media content stream might include at least one of a title of the at least one media content, a stream content name, a stream file name, information regarding multiple files in a media stream, a timestamp associated with the at least one media content, a channel associated with the at least one media content, or a network associated with the at least one media content, and/or the like. The timestamp might indicate at least one of a point in time in the media content stream when the error was detected or a point in time in the at least one media content that was saved before the error was detected. In some cases, particularly with respect to the case of multiple files in the media stream, the error can be in one of the multiple files but not all of them.

In some cases, a notification may be sent periodically (e.g., every few seconds, every few minutes, etc.) by media player 105 to at least one of a display device 110, a user device 120, and/or computing system 160 (which may include at least one of a service provider device and/or content provider device, and/or the like), and/or the like. The notification might include information associated with the media content stream (e.g., at least one of a title of the at least one media content, a stream content name, a stream file name, information regarding multiple files in a media stream, a timestamp associated with the at least one media content, a channel associated with the at least one media content, or a network associated with the at least one media content, and/or the like). Additionally and/or alternatively, the notification may be sent by the media player 105 when the media player 105 detects an error (e.g., when the media player 105 detects that it is losing power, and/or the like). In some embodiments, each stream of media content might comprise a plurality of profiles. In some cases, each profile might represent a different resolution of a particular media content (e.g., low resolution profile, medium resolution profile, and/or high resolution profile, or the like). In some instances, the different resolution profiles might each utilize different encoders for encoding the particular profile (e.g., a low-cost/low-end encoder for encoding the low resolution profile, a medium-cost/medium-end encoder for encoding the medium resolution profile, a high-cost/high-end encoder for encoding the high resolution profile, or the like). Although three resolutions are described above, any suitable number of profiles may be used for each media content stream, or the like.

Additionally and/or alternatively, when the media player 105 determines that the error in the network(s) 130 and/or network(s) 150 is influencing a media content stream, the media player 105 might: (1) automatically record the media content stream (via media player 105, user device 120, media content source 140, and/or computing system 160); (2) prompt a user to record the media content stream; (3) automatically switch the source of the media content stream (e.g., switch a video content source, switch a content provider, switch to on-demand, switch to broadcast, and/or the like); (4) prompt a user to switch a source of the media content stream; (5) identify and display a list of one or more available media players, display devices, and/or user devices to display the media content stream; or (6) identify and automatically display the media content on one or more available media players, display devices, and/or user devices to display the media content stream; and/or the like.

Based on the information associated with the media content stream, the one or more available media players, display devices, and/or user devices may automatically resume playing the media content stream from the point when the error was detected or from a point in time just before the error occurred.

Figure 2:
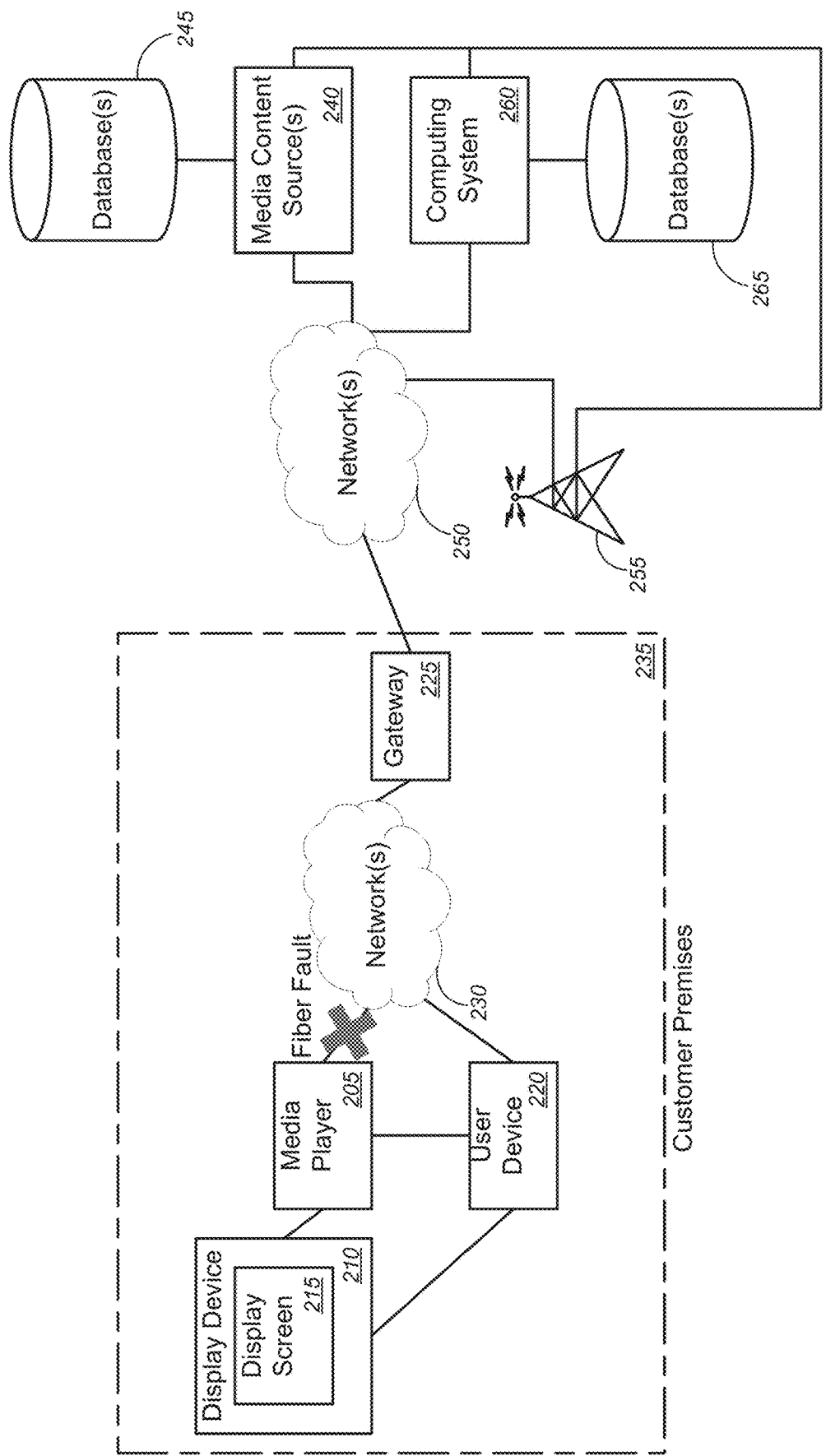
FIG. 2 is a schematic diagram illustrating another system for implementing error and/or fault detection in a network(s) and/or media stream, in accordance with various embodiments.

FIG. 2 is a schematic diagram illustrating another system for implementing error and/or fault detection in a network(s) and/or media stream, in accordance with various embodiments. In FIG. 2, a fault might occur with media player 205 and/or in a communication line communicatively coupled to media player 205. As the fault and/or error might be occurring (which might include, without limitation, a cut, a bend, a break, a kink, a loss of power, or the like) until all connection is lost, signal degradation might be observed by media player 205. In response to such detection of signal degradation, media player 205 might send a notification (i.e., a dying gasp, or the like) to a user device 220, one or more service provider devices located in media content source 240 and/or computing system 260, and/or one or more content provider devices located in media content source 240 and/or computing system 260. The notification may be similar to the notifications described with respect to FIG. 1 and include information associated with the error in the network and/or associated with a media stream that is playing on media player 205 and/or user device 220. The notification may also include one or more options to address the error in the network.

In this manner and based on the notification received from the media player 205, the media player 205, user device 220, gateway 225, media content source 240, and/or computing system 260 might be able to identify that an error is occurring with the media player 205, a communication line communicatively coupled to the media player, and/or the like, and thus can more easily and more readily implement options to repair or replace the media device 205 and/or one or more communication lines communicatively coupled to media player 205.

Additionally and/or alternatively, because the media player 205 detects an error occurring with the media player 205 and/or a communication line communicatively coupled to media player 205, the media player 205, user device 220, gateway 225, media content source 240, and/or computing system 260 may be able to determine that the error is occurring in a local area network associated with a customer premises 235 and not in a service provider network and/or content provider network. In some embodiments, the system might automatically open a ticket in the help desk to address the detected error. Alternatively, or additionally, the system might open a return materials authorization ("RMA") for malfunctioning equipment located at the customer premises 235, might automatically ship a new device to the user, and might automatically send return packaging to the user for shipping the malfunctioning equipment.

In some embodiments, one or more of the user device 220, gateway 225, media content source 240 (which may include one or more content provider devices, one or more service provider devices, and/or the like), and/or computing system 260 (which may include one or more content provider devices, one or more service provider devices, and/or the like) might also detect that the media player 205 is experiencing signal degradation and might send a notification to one or more user devices 220, one or more service provider devices, and/or one or more content provider devices.

The notification may identify the error and/or fault occurring with media player 205 and/or a communication line communicatively coupled to media player 205. The identification of the error and/or fault may indicate that an error and/or fault is occurring in at least one of the media player 205 and/or a communication line communicatively coupled to the media player 205, and/or the like.

In some cases, the one or more display devices 210, the one or more user devices 220, the one or more service provider devices located in media content source 240 and/or computing system 260, and/or the one or more content provider devices located in media content source 240 and/or computing system 260, and/or the like might display the notification containing the one or more options to address the error with media player 205.

The notification may contain one or more options for a user, technician, service provider, content provider, and/or the like to address and/or correct the error occurring with media player 205. The one or more options may include, without limitation: (1) an option to display instructions indicating steps to follow to address the error in media player 205; (2) an option to contact at least one of a user, a service provider, or a content provider; (3) an option to automatically set up a call (e.g., a voice call, a video call, a chatbot chat session, and/or the like) or a chat session (e.g., an instant messaging session or a text messaging session, etc.) between the user and at least one of the service provider or the content provider; (4) an option to restart the media player 205; (5) an option to open a ticket indicating the error with media player 205 with at least one of the service provider or the content provider; and/or (6) an option to run a bot with predetermined steps to determine whether the error is local or system-wide using remote test automation ("RTA") or the like, and either to return results to the system and/or the user with information regarding the error and/or to automatically solve the error based on the RTA with option to contact the user with a notification indicating that the error has been solved; and/or the like.

In various embodiments, a user, technician, service provider, and/or content provider may select via the display device 210, user device 220, the service provider device, and/or the content provider device, at least one option to address the error occurring with media player 205. By selecting at least one of the one or more options, at least one of the following may occur: (1) at least one of a user device 220, a display device 210, a service provider device, and/or a content provider device may display instructions indicating steps to follow to address the error with media player 205; (2) an email, text message, etc. may be sent to at least one of a user (via at least one of a user device 220, a display device 210, and/or the like), a service provider (via at least one of a service provider device), a content provider (via at least one of a content provider device) to contact at least one of the user, service provider, and/or content provider; (3) a call (e.g., a voice call, a video call, and/or the like) or a chat session (e.g., an instant messaging session or a text messaging session, etc.) may be automatically set up between the user (via a user device 220 and/or display device 210) and at least one of the service provider (via a service provider device) or the content provide (via a content provider device); (4) the media player 205 may be automatically restarted; (5) a ticket indicating the error with the media device 205 may be opened with at least one of the service provider or the content provider; and/or (6) the system to perform RTA to determine whether the error is local or system-wide and either to return the results to the system and/or the user with information regarding the error and/or to automatically solve the error based on the RTA and to optionally contact the user with the notification indicating that the error has been solved; and/or the like.

The email, text message, ticket, and/or the like may indicate that the media player 205 is experiencing signal degradation and may contain one or more options to correct and/or fix the media device 205.

Additionally and/or alternatively, a user may select an option to schedule a technician to fix the media player 205. Selecting this option may allow a user to set-up an appointment with a technician and for the notification to be sent to the technician scheduled to fix the media player 205.

Similar methods and/or systems may be used to detect an error and/or fault occurring with display device 210, user device 220, and/or the like.

Figure 3:
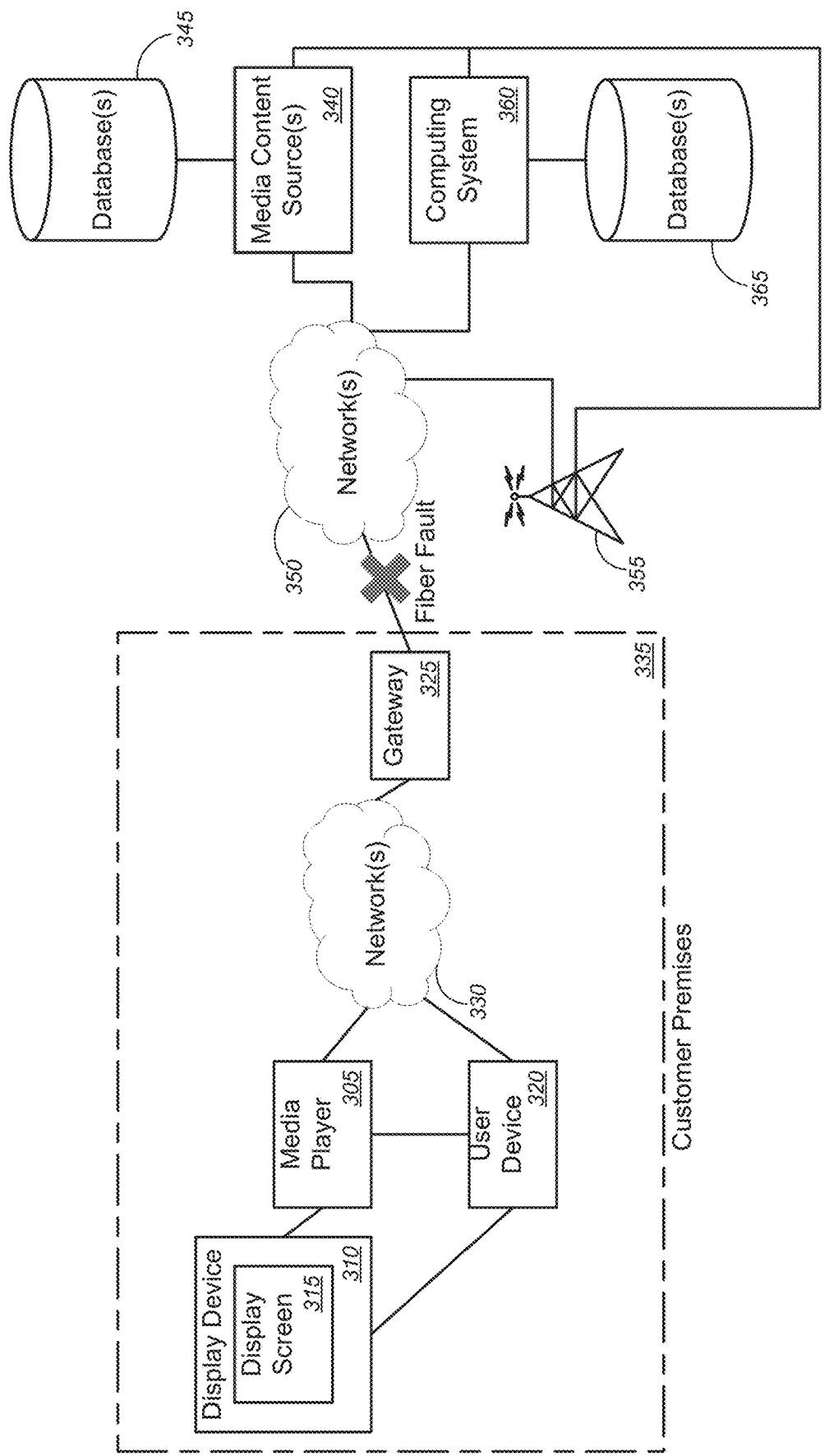
FIG. 3 is a schematic diagram illustrating yet another system for implementing error and/or fault detection in a network(s) and/or media stream, in accordance with various embodiments.

FIG. 3 is a schematic diagram illustrating yet another system for implementing error and/or fault detection in a network(s) and/or media stream, in accordance with various embodiments. In FIG. 3, the fault might occur at gateway 325, in a communication line communicatively coupled to gateway 325, in network 350, at a media content source 340, in a communication line communicatively coupled to media content source 340, and/or the like. In this case, one or more of the media player 305, display device 310, user device 320, and/or gateway 325 may send one or more notifications indicating that the media player 305, user device 320, and/or gateway 325 is experiencing signal degradation to one or more user devices 320, one or more service provider devices, one or more content provider devices, etc. Upon receiving simultaneous or near simultaneous notifications from the one or more of the media player 305, display device 310, user device 320, and/or gateway 325, the media player 305, one or more user devices 320, one or more service provider devices, one or more content provider devices, etc. might determine that the fault occurred at the gateway 325, in a communication line communicatively coupled to gateway 325, in network 350, at a media content source 340, in a communication line communicatively coupled to media content source 340, and/or the like. A notification may then be sent indicating where the fault occurred and appropriate options for repair might be initiated, as described with respect to FIGS. 1 and 2.

Figure 4:
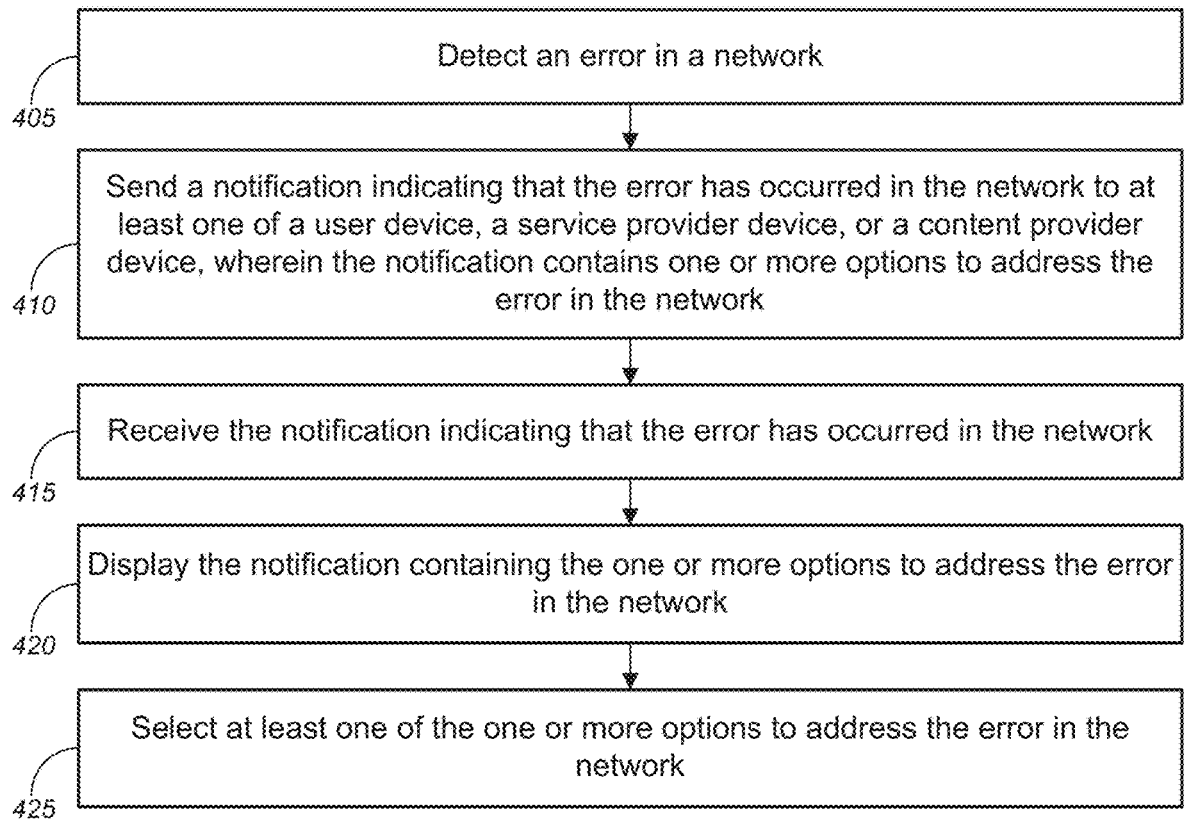
FIG. 4 is a flow diagram illustrating a method for implementing error and/or fault detection in a network(s), in accordance with various embodiments.

FIG. 4 is a flow diagram illustrating a method 400 for implementing error and/or fault detection in a network(s), in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4, method 400, at block 405, might comprise detecting, with a computing system, an error or fault occurring in a first network. The error or fault may be occurring in at least one of a service provider network, a content provider network, and/or a local area network, and/or the like. The error or fault may be at least one of a reduction in bandwidth to the customer premises. Additionally and/or alternatively, the error or fault might be at least one of an error occurring in a WiFi connection, an error occurring in a digital subscriber line, an error occurring in a fiber-optic connection, or an error occurring in at least one of a modem, a gateway, a set top box, a desktop computer, a laptop computer, a tablet computer, a wireless phone, a gaming console, a media player, or a remote-control device, and/or the like.

In some cases, method 400, at block 410, might additionally include sending, with the computing system, a notification indicating that the error has occurred in the first network to at least one of a user device, a service provider device, or a content provider device. The notification may contain one or more options to address the error in the first network. Sending the notification to at least one of a use device, a service provider device, a content provider device, and/or the like might optionally include sending the notification via a second network that is different from the first network.

In some cases, the computing system that detected the error might be the same as at least one of the user device, the service provider device, or the content provider device. In other cases, the computing system that detected the error might be different from any of the user device, the service provider device, or the content provider device. Additionally and/or alternatively, the computing system may be at least one of a modem, a gateway, a set top box, a desktop computer, a laptop computer, a tablet computer, a server computer, a wireless phone, a video game console, or a remote-control device, and/or the like. The at least one of the user device, the service provider device, or the content provider device might include at least one of a set top box, a desktop computer, a laptop computer, a tablet computer, a server computer, a wireless phone, a gaming console, or a remote-control device, and/or the like.

The notification might be sent as a dying gasp—i.e., as the computing system detects that one or more components (e.g., one or more communications connections, one or more user devices, one or more service provider devices, one or more content provider devices, one or more modems, one or more gateways, one or more set top boxes, one or more desktop computers, one or more laptop computers, one or more tablet computers, one or more server computers, one or more wireless phones, one or more video game consoles, one or more media players, or one or more remote control devices, etc.) are failing, the computing system might send a notification indicating that the one or more components are failing (i.e., an indication that the one or more components are experiencing a loss of power, an indication that the one or more components need to be restarted, and/or the like).

The one or more options included in the notification might include, without limitation, at least one of: (1) an option to display instructions indicating steps to follow to address the error in the first network; (2) an option to contact (e.g., via text or email) at least one of a user, a service provider, or a content provider; (3) an option to automatically set up a call (e.g., voice call, video call, a chatbot chat session, etc.) or a chat session (e.g., an instant messaging session or a text messaging session, etc.) between the user and at least one of the service provider or the content provider; (4) an option to restart at least one of a modem, a gateway, a set top box, a desktop computer, a laptop computer, a tablet computer, a wireless phone, a gaming console, a media player, or a remote control device; (5) an option to open a ticket indicating the error in the first network with at least one of the service provider or the content provider; or (6) an option to run a bot with predetermined steps to determine whether the error is local or system-wide using remote test automation ("RTA") or the like, and either to return results to the system and/or the user with information regarding the error and/or to automatically solve the error based on the RTA with option to contact the user with a notification indicating that the error has been solved; and/or the like.

In some embodiments, the notification might further include an indication of the error occurring in the first network. The notification might indicate that the error is occurring in a local area network, a service provider network, a content provider network, and/or the like. The notification might indicate that there has been a reduction in bandwidth to the customer premises. Additionally and/or alternatively, the notification might indicate that the error is occurring in a WiFi connection, the error is occurring in a digital subscriber line, the error is occurring in a fiber-optic connection, or the error is occurring in at least one of a modem, a gateway, a set top box, a desktop computer, a laptop computer, a tablet computer, a wireless phone, a gaming console, a media player, or a remote-control device, and/or the like.

In some cases, method 400, at block 415, might include receiving, with the at least one of the user device, the service provider device, or the content provider device, the notification indicating that the error has occurred in the first network and, at block 420, displaying, with the at least one of the user device, the service provider device, or the content provider device, the notification containing the one or more options to address the error in the first network.

In some embodiments, method 400, at block 425, might also include selecting, with the at least one of the user device, the service provider device, or the content provider device, at least one of the one or more options to address the error in the first network. Selecting the one or more options might cause one or more of: (1) at least one of the instructions indicating steps to follow to address the error in the first network to be displayed; (2) at least one of the user, the service provider, or the content provider to be contacted; (3) the call or the chat session between the user and at least one of the service provider or the content provider to be set up; (4) at least one of the modem, the gateway, the set top box, the desktop computer, the laptop computer, the tablet computer, the wireless phone, the gaming console, the media player, or the remote control device to be restarted; and/or (5) the ticket indicating the error with the first network with at least one of the service provider or the content provider to be opened; and/or the like.

Figure 5:
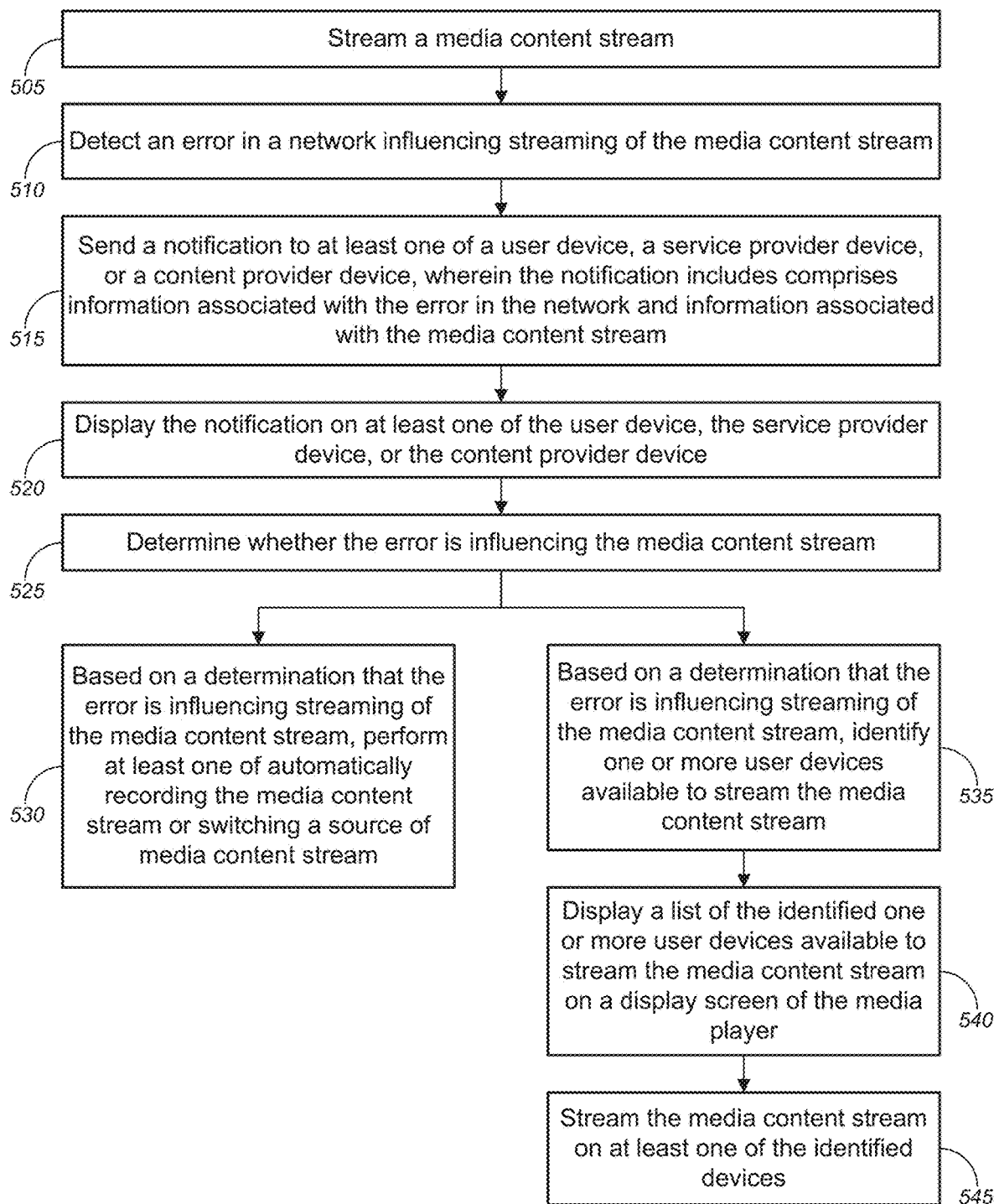
FIG. 5 is a flow diagram illustrating a method for implementing error and/or fault detection in a media content stream, in accordance with various embodiments.

In some cases, method 400, might include the method 500, shown in FIG. 5. Alternatively, method 500 might be a standalone method to address one or more errors influencing a media content stream.

FIG. 5 is a flow diagram illustrating a method 500 for implementing error and/or fault detection with a media content stream, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 500 illustrated by FIG. 5 (e.g., by executing instructions embodied on a computer readable medium), the systems 100, 200, and 300 of FIGS. 1, 2, and 3 can each also operate according to other modes of operation and/or perform other suitable procedures.

In some embodiments, method 500, at block 505, might include streaming, with a media player or a user device, a media content stream containing at least one media content. The media player might include, without limitation, at least one of a set top box, a desktop computer, a laptop computer, a tablet computer, a wireless phone, or a gaming console, and/or the like. The at least one media content might include, but is not limited to, at least one of audio, music, or video content, and/or the like.

The media player or the user device might detect an error in a network influencing streaming of the media content stream (block 510). At block 515, the method 500, might include sending, with the media player or the user device, a notification to at least one of a user device, a service provider device, or a content provider device. The notification might include information associated with the error in the network and information associated with the media content stream. The notification might be sent periodically (e.g., every second, every minute, etc.) to the at least one of the user device, the service provider device, or the content provider device, or the notification may be sent only when the error is detected.

The information associated with the error might include an identification of the error occurring in the network. The notification might indicate that the error is occurring in a local area network, a service provider network, or a content provider network, and/or the like. The notification might indicate that there has been a reduction in bandwidth to the customer premises. Additionally and/or alternatively, the notification might indicate that the error is occurring in a WiFi connection, the error is occurring in a digital subscriber line, the error is occurring in a fiber-optic connection, or the error is occurring in at least one of a modem, a gateway, a set top box, a desktop computer, a laptop computer, a tablet computer, a wireless phone, a gaming console, a media player, or a remote-control device, and/or the like.

In various embodiments, the information included in or associated with the media content stream might include, without limitation, at least one of a title of the at least one media content, a timestamp associated with the at least one media content, a channel associated with the at least one media content, or a network associated with the at least one media content, and/or the like. The timestamp might indicate at least one of a point in time in the media content stream when the error was detected or a point in time in the at least one media content that was saved before the error was detected, and/or the like.

The method 500, at block 520, may then comprise displaying the notification on at least one of the user device, the service provider device, and/or the content provider device.

In some cases, the method 500 might continue, at block 525, by determining whether the error is influencing streaming of the media content stream. Based on a determination that the error is influencing streaming of the media content stream, the method 500 might comprise performing, with the media player or the user device, at least one of automatically recording the media content stream or automatically switching a source of the media content stream (block 530). The media content stream might be automatically recorded by a user device (e.g., a digital video recorder, etc.), a content provider device, and/or a service provider device. The entire program associated with the media content stream may be recorded, a portion of the media content stream may be recorded from a point in time when the error was detected, and/or a portion of the media content may be recorded from a point in time when the periodic notification was sent by the media player and/or the user device. A user may then retrieve the recorded video content from when the error occurred. Additionally and/or alternatively, the source of the media content stream may be automatically switched from a first content source to a second content source (e.g., from broadcast to OnDemand, from a first content provider to a second content provider, from cable to an online application, and/or the like).

In various additional embodiments, based on a determination that the error is influencing streaming of the media content stream, the method 500, at block 535, might identify, with the media player or the user device, one or more additional media players and/or additional user devices available to stream the media content stream. The identified devices might include one or more devices in proximity to the media player and/or the user device, one or more devices associated with a viewer viewing the original media content stream, and/or the like.

The media player and/or user device might then display a list of the identified one or more user devices available to stream the media content stream on a display screen of the media player (block 540). The display of the list might be displayed with the media player and/or on a user device. The display might give a user the option to select one or more user devices to display the media content. A user selection might cause the media stream to be played automatically on the selected user device.

Alternatively, the display might indicate one or more display devices where the media stream has already automatically begun playing. The media player and/or the user device may select an additional device to automatically begin displaying the media stream based on one or more factors including additional devices associated with one or more users viewing the media stream, proximity of the additional devices to the media player and/or the user device, and/or the like.

The method 500, at block 545, might include streaming the media content on at least one of the identified devices. In order to stream the media content, the identified devices might utilize the information associated with the at least one media content to identify the at least one media content that was streaming at the media player or the user device. This information may include, but is not limited to, at least one of a title of the media content, a season of the media content, an episode of the media content, a point in time when the error began influencing streaming of the media content stream, and/or a point in time before the error began influencing streaming of the media content, and/or the like. The one or more identified user devices may then stream the media content from at least one of the determined point in time in the media content when the error occurred or the determined point in time in the media content before the error occurred.

FIGS. 6A-6C (collectively, "FIG. 6") are block diagrams illustrating various non-limiting examples 600, 600', and 600" of error and/or fault detection in a network(s), in accordance with various embodiments.

With reference to FIG. 6, a gateway device 605 that is located at a customer premises associated with a user might communicatively couple with a streaming service source or content source 620 via the Internet 615 and via a network access point ("NAP") 615 connecting the gateway device 605 to the Internet 615. In some embodiments, remote test automation ("RTA") or the like may be used to determine whether the error is located local to a user's customer premises (i.e., at the gateway device 605, or the like), located within the service provider's network (e.g., at the NAP 610, or the like), and/or located within the system associated with the content provider (i.e., at the streaming service source 620, or the like).

For example, with reference to the non-limiting example 600 of FIG. 6A, the RTA or the system might determine that the gateway device (or modem) 605 that is located at the customer premises is functioning within normal parameters, might determine that the network access point ("NAP") 610 (or other network equipment operated by the network service provider) is functioning within normal parameters, and might determine that the error is located at the streaming service source 620 associated with the content provider, as denoted by the circle symbols under the block representing the gateway device 605, under the block representing the NAP 610, and under the icon representing the Internet 615, and denoted by the "X" symbol under the block representing the streaming service source 620 in FIG. 6A. In such a case, based on such determination, the system might automatically send a message to the content provider with information regarding the error and with a request for the content provider to address the error.

In another embodiment, as depicted in the non-limiting example 600' of FIG. 6B, the RTA or the system might determine that the gateway device (or modem) 605 that is located at the customer premises is functioning within normal parameters, might determine that the error is located at the network access point ("NAP") 610 (or at least one other network equipment operated by the network service provider), and might determine that the streaming service source 620 associated with the content provider is functioning within normal parameters, as denoted by the circle symbols under the block representing the gateway device 605, under the icon representing the Internet 615, and under the block representing the streaming service source 620, and denoted by the "X" symbol under the block representing the NAP 610 in FIG. 6B. In such a case, based on such determination, the system might automatically open a ticket (either with notification sent to the customer or user, or with no notification sent to the customer or user, or the like), and in some cases, might automatically dispatch a technician to perform a truck roll to address the error at the NAP 610 (or at the location of the at least one other network equipment) while sending the technician information regarding the error and tips or solutions for addressing the error.

In yet another embodiment, as depicted in the non-limiting example 600" of FIG. 6C, the RTA or the system might determine that the error is located at that the gateway device (or modem) 605 that is located at the customer premises, might determine the network access point ("NAP") 610 (or at least one other network equipment operated by the network service provider) is functioning within normal parameters, and might determine that the streaming service source 620 associated with the content provider is functioning within normal parameters, as denoted by the circle symbols under the block representing the NAP 610, under the icon representing the Internet 615, and under the block representing the streaming service source 620, and denoted by the "X" symbol under the block representing the gateway device 605 in FIG. 6B. In such a case, based on such determination, the system might automatically open a ticket to address the detected error. Alternatively, or additionally, the system might open a return materials authorization ("RMA") for the malfunctioning equipment (i.e., the malfunctioning gateway device 605) located at the customer premises, might automatically ship a new device (i.e., new gateway device) to the user, and might automatically send return packaging to the user for shipping the malfunctioning equipment (i.e., the malfunctioning gateway device 605).

Exemplary System and Hardware Implementation

Figure 7:
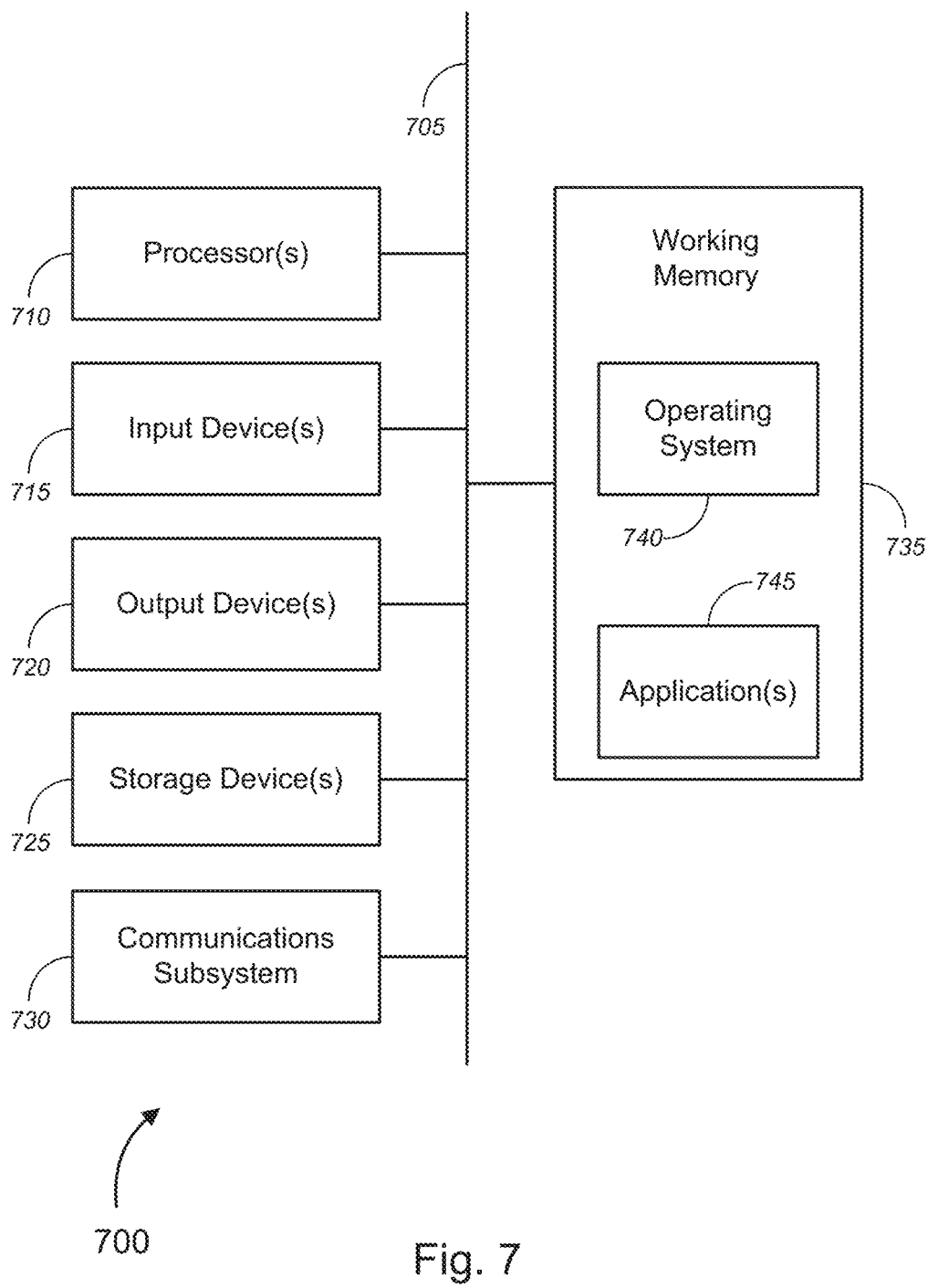
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., media players 105, 205, and 305, display devices 110, 210, and 310, user devices 120, 220, and 320, gateway(s) 125, 225, 325, and 605, media content sources (or servers) 140, 240, 340, and 620, computing systems 160, 260, and 360, etc.), as described above.

It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., media players 105, 205, and 305, display devices 110, 210, and 310, user devices 120, 220, and 320, gateway(s) 125, 225, 325, and 605, media content sources (or servers) 140, 240, 340, and 620, computing systems 160, 260, and 360, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. In some aspects, the communications subsystem 730 might also comprise a wireless video link system, which might utilize a wireless video link protocol comprising at least one of WirelessHD protocol, Wireless Home Digital Interface ("WHDI") protocol, or Wireless Gigabit Alliance ("WiGig") protocol, and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
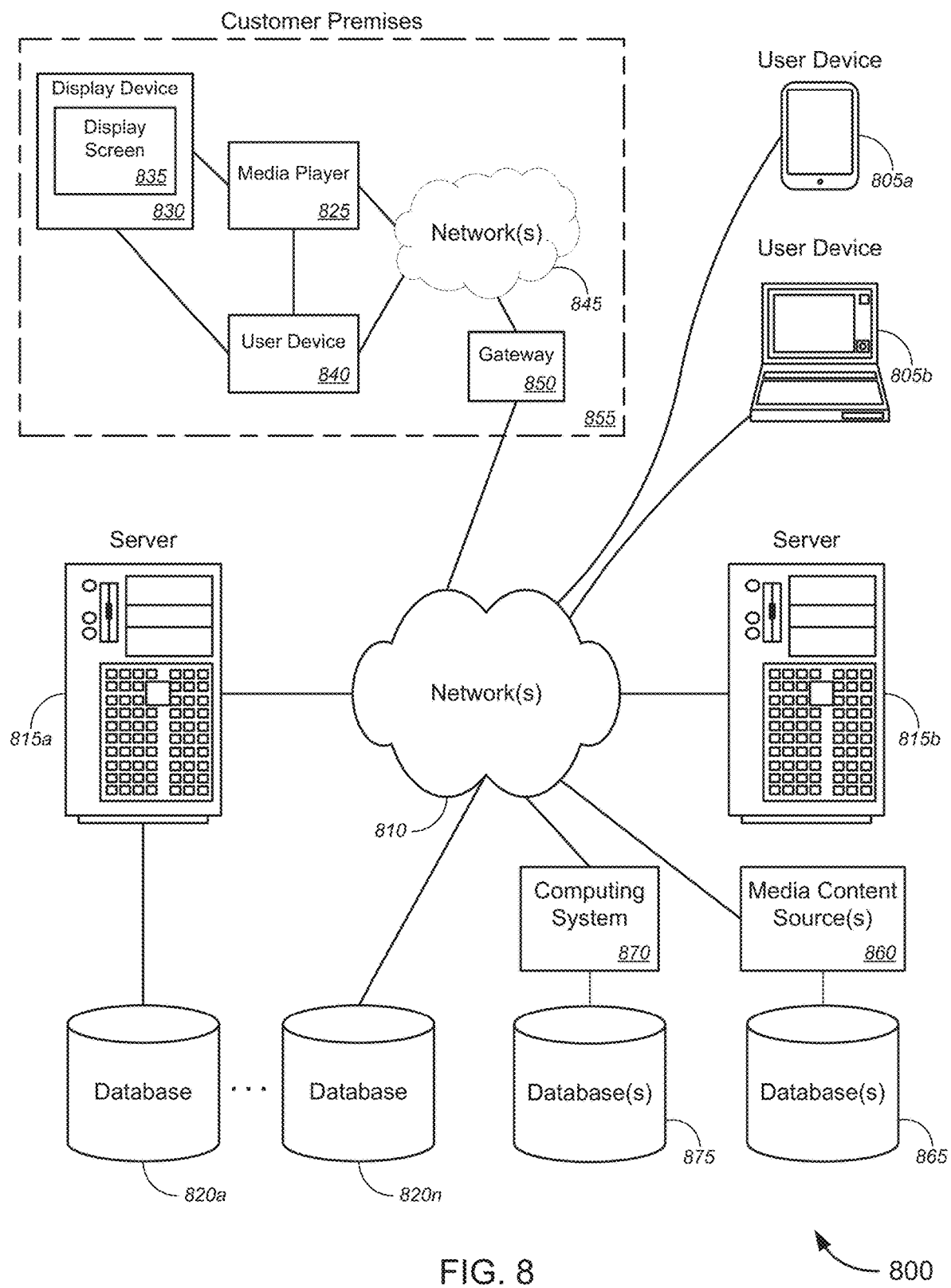
FIG. 8 is a block diagram illustrating a networked system of computers, computing systems, or system hardware architecture, which can be used in accordance with various embodiments.

As noted above, a set of embodiments comprises methods and systems for implementing error and/or fault detection in a network, and, more particularly, to methods, systems, and apparatuses for implementing error and/or fault detection in a network and/or media stream and providing options to address the error and/or fault in the network and/or media stream. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 130 or 150 of FIG. 1, network(s) 230 or 250 of FIG. 2, network(s) 330 or 350 of FIG. 3, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing error detection in a network, and, more particularly, to methods, systems, and apparatuses for implementing error and/or fault detection in a network and/or media stream and providing options to address the error and/or fault in the network and/or media stream, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820*a*-820*n* (collectively, "databases 820"). The location of each of the databases 820 is discretionary: merely by way of example, a database 820*a* might reside on a storage medium local to (and/or resident in) a server 815*a* (and/or a user computer, user device, or customer device 805). Alternatively, a database 820*n* can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a media player 825 (similar to media player 105, 205, and 305 of FIGS. 1-3, etc.). System 800, according to some embodiments, might also comprise one or more display devices 830 (similar to display devices 110, 210, and 310 of FIGS. 1-3, etc.), which might each include a display screen(s) 835 (similar to display screens 115, 215, and 315 of FIGS. 1-3, etc.). Additionally and/or alternatively, system 800 might further comprise one or more user devices 840 (similar to user devices 120, 220, and 320 of FIGS. 1-3, etc.), and/or the like.

In some cases, system 800 might include a network 845 (similar to network(s) 130, 230, and 330 of FIGS. 1-3, etc.). Network 845 may be a local area network, and/or the like. In addition, system 800 might include a gateway 850 (similar to gateway(s) 125, 225, and 325 of FIGS. 1-3, etc.). Gateway 850 might be used to communicatively couple network(s) 810 and 845.

Additionally and/or alternatively, the media player 825, the one or more display devices 830 (including the display screen(s) 835), the user device(s) 840, and/or the gateway 850 may disposed within a customer premises 855.

System 800 might further comprise one or more media (e.g., video, audio, or game) content sources or servers 860 (similar to media content source(s) 140, 240, and 340 of FIGS. 1-3, etc.) and corresponding database(s) 865 (similar to database(s) 145, 245, and 345 of FIGS. 1-3, etc.) that might communicatively couple to the media player 825 via one or more networks 810 and/or 845. Additionally and/or alternatively, system 800 might include one or more computing systems 870 (similar to computing system(s) 160, 260, and 360 of FIGS. 1-3, etc.) associated with a service provider and/or content provider and one or more corresponding databases 875 (similar to database(s) 165, 265, and 365 of FIGS. 1-3, etc.).

In operation, in a first embodiment, the media player 825, the one or more display devices 830, the one or more user devices 840, the one or more gateways 850, one or more modems, one or more media content sources 860, one or more computing system 870, and/or the like might detect an error or fault within a network 810 and/or network(s) 845. The error or fault in the network(s) 810 and/or network(s) 845 may occur in a local area network, in a service provider network, in a content provider network, in the media player 825, in the display device 830, in the user device 840, in the media content source 860, in the gateway 850, and/or in the computing system 870, and/or the like.

In some embodiments, based on the detection of an error occurring in network(s) 810 and/or network(s) 845, the media player 825, display device 830, user device 840, media content sources 860, gateway 850, and/or computing system 870, and/or the like, may send a notification indicating that the error has occurred in the network(s) 810 and/or network(s) 845 to at least one of a media player 825, a display device 830, a user device 840, gateway 850, media content source 860, computing system 870, and/or the like. The notification may then be displayed on a display screen communicatively coupled to the media player 825, display device 830, user device 840, gateway 850, media content sources 860, and/or computing system 870, and/or the like. The notification may include one or more options to address the error occurring with network(s) 810 and/or network(s) 845, the media player 825, display device 830, user device 840, gateway 850, media content sources 860, and/or computing system 870, and/or the like.

In operation, in a second embodiment, media player 825 may detect an error occurring in the streaming of a media content stream. The media player 825 may then send a notification to at least one of a display device 830, a user device 840, media content source 860, and/or computing system 870. The notification may include information associated with the error in the network and information associated with the media content stream.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    streaming, with a media player, a media content stream containing at least one media content;
    detecting, with the media player, an error in a network influencing streaming of the media content stream;
    sending, with the media player, a notification to at least one of a user device, a service provider device, or a content provider device, wherein the notification comprises information associated with the error in the network and information associated with the media content stream;
    determining, with the media player, whether the error is influencing streaming of the media content stream; and
    based on a determination that the error is influencing streaming of the media content stream,
    performing, with the media player, at least one of automatically recording the media content stream or automatically switching a source of the media content stream, and
    automatically resuming, with the media player, playing the media content stream from the point when the error was detected or from a point in time just before the error occurred.

2. The method of claim 1, wherein the media player is at least one of a set top box, a desktop computer, a laptop computer, a tablet computer, a wireless phone, or a gaming console.

3. The method of claim 1, wherein the information associated with the error in the network comprises an identification of the error occurring in the network.

4. The method of claim 1, wherein the error is a reduction in bandwidth.

5. The method of claim 1, wherein the error in the network is at least one of an error occurring in a WiFi connection, an error occurring in a digital subscriber line, or an error occurring in at least one of a modem, a gateway, a set top box, a desktop computer, a laptop computer, a tablet computer, a wireless phone, a gaming console, a media player, or a remote control device.

6. The method of claim 1, wherein the information associated with the media content stream comprises at least one of a title of the at least one media content, a timestamp associated with the at least one media content, a channel associated with the at least one media content, or a network associated with the at least one media content.

7. The method of claim 6, wherein the timestamp indicates at least one of a point in time in the media content stream when the error was detected or a point in time in the at least one media content that was saved before the error was detected.

8. The method of claim 1, wherein sending the notification to the at least one of the user device, the service provider device, or the content provider device comprises periodically sending, with the media player, information associated with the media content stream to the at least one of the user device, the service provider device, or the content provider device.

9. The method of claim 1, further comprising:
    determining, with the media player, whether the error is influencing streaming of the media content stream;
    based on a determination that the error is influencing streaming of the media content stream, identifying, with the media player, one or more user devices available to stream the media content stream; and
    displaying, with the media player, a list of the identified one or more user devices available to stream the media content stream on a display screen of the media player.

10. The method of claim 9, further comprising:
    based on the determination that the error is influencing streaming of the media content stream, streaming, with the identified one or more user devices, the media content stream, wherein the identified one or more user devices utilize the information associated with the at least one media content to identify the at least one media content that was streaming at the media player at a point in time when the error began influencing streaming of the media content stream.

11. The method of claim 10, wherein streaming, with the identified one or more user devices, the media content stream comprises:
    based on the information associated with the at least one media content, determining, with the identified one or more user devices, at least one of a point in time in the media content when the error occurred or a point in time in the media content before the error occurred; and streaming, with the identified one or more user devices, the media content stream from at least one of the determined point in time in the media content when the error occurred or the determined point in time in the media content before the error occurred.

12. A system comprising:

a media player, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the media player to:

stream a media content stream containing at least one media content;

detect an error in a network influencing streaming of the media content stream;

send a notification to at least one of a user device, a service provider device, or a content provider device, wherein the notification comprises information associated with the error in the network and information associated with the media content stream;

determine whether the error is influencing streaming of the media content stream; and based on a determination that the error is influencing streaming of the media content stream, perform at least one of automatically recording the media content stream or automatically switching a source of the media content stream, and automatically resume, with the media player, playing the media content stream from the point when the error was detected or from a point in time just before the error occurred.

13. The system of claim 12, wherein the information associated with the error in the network comprises an identification of the error occurring in the network.

14. The system of claim 12, wherein the information associated with the media content stream comprises at least one of a title of the at least one media content, a timestamp associated with the at least one media content, a channel associated with the at least one media content, or a network associated with the at least one media content.

15. The system of claim 14, wherein the timestamp indicates at least one of a point in time in the media content stream when the error was detected or a point in time in the at least one media content that was saved before the error was detected.

16. The system of claim 12, wherein the first set of instructions, when executed by the at least one first processor, further causes the media player to:

determine whether the error is influencing streaming of the media content stream;

based on a determination that the error is influencing streaming of the media content stream, identify one or more user devices available to stream the media content stream;

display a list of the identified one or more devices available to stream the media content stream on a display screen of at least one of the media player, the user device, the service provider device, or the content provider device; and receive a selection of at least one identified device.

17. The system of claim 16, further comprising:

the least one identified device comprising:

at least one second processor; and a second non-transitory computer readable medium communicatively coupled to the at least one second processor, the second non-transitory computer readable medium having stored thereon computer software comprising a second set of instructions that, when executed by the at least one second processor, causes the at least one identified device to:

stream the media content stream based on the selection of the at least one identified device.

18. The system of claim 17, wherein the at least one identified device utilizes the information associated with the at least one media content to identify the at least one media content that was streaming at the media player at a point in time when the error began influencing streaming of the media content stream.

* * * * *